(No Model.)  4 Sheets—Sheet 1.

E. A. NEWMAN.
ANTI-FREEZING APPARATUS FOR WATER PIPES.

No. 346,308. Patented July 27, 1886.

Witnesses
C. A. Davidson.
L. B. Night.

Inventor
Edwin A. Newman,
By his Attorneys

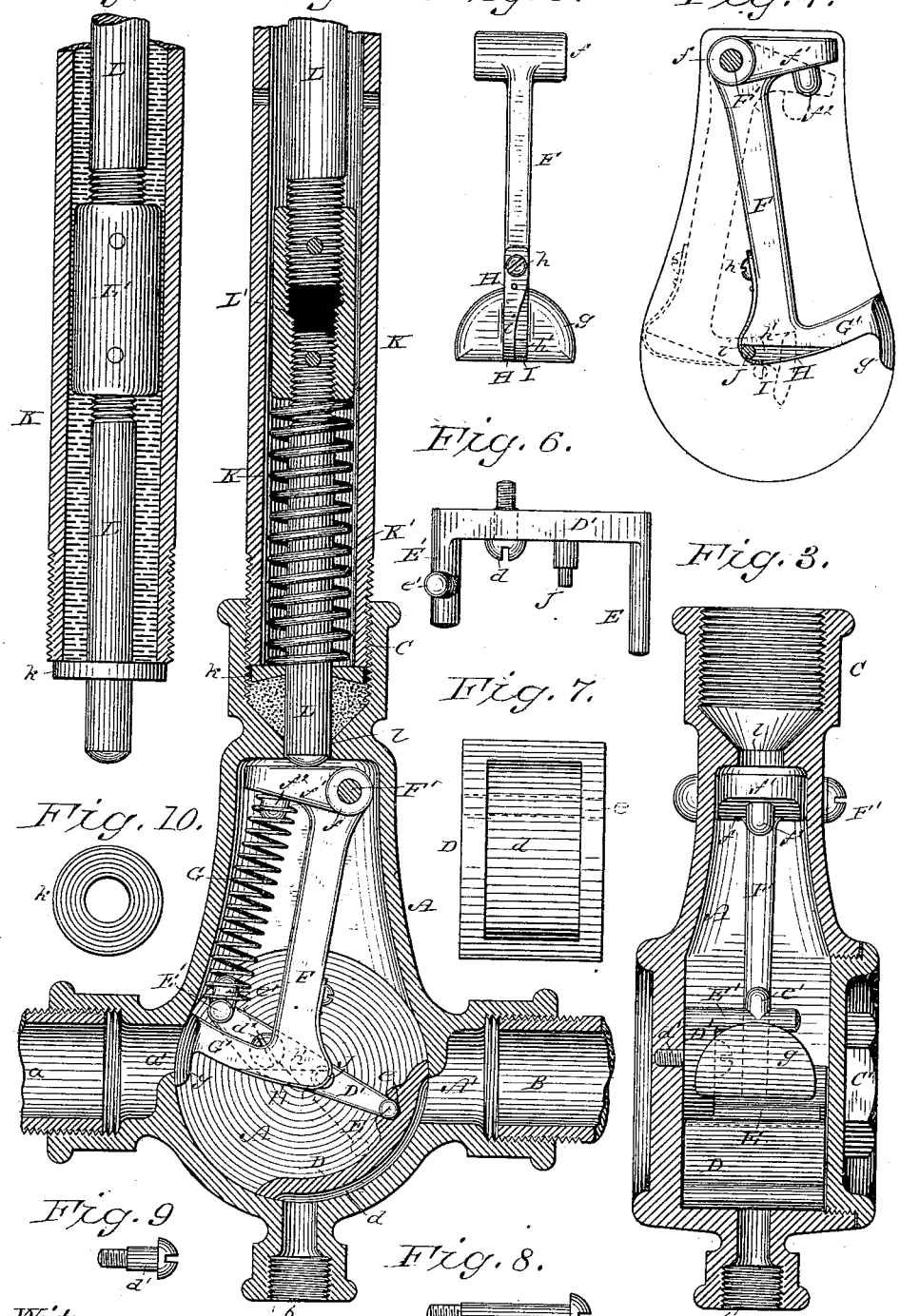

(No Model.) 4 Sheets—Sheet 3.
E. A. NEWMAN.
ANTI-FREEZING APPARATUS FOR WATER PIPES.
No. 346,308. Patented July 27, 1886.
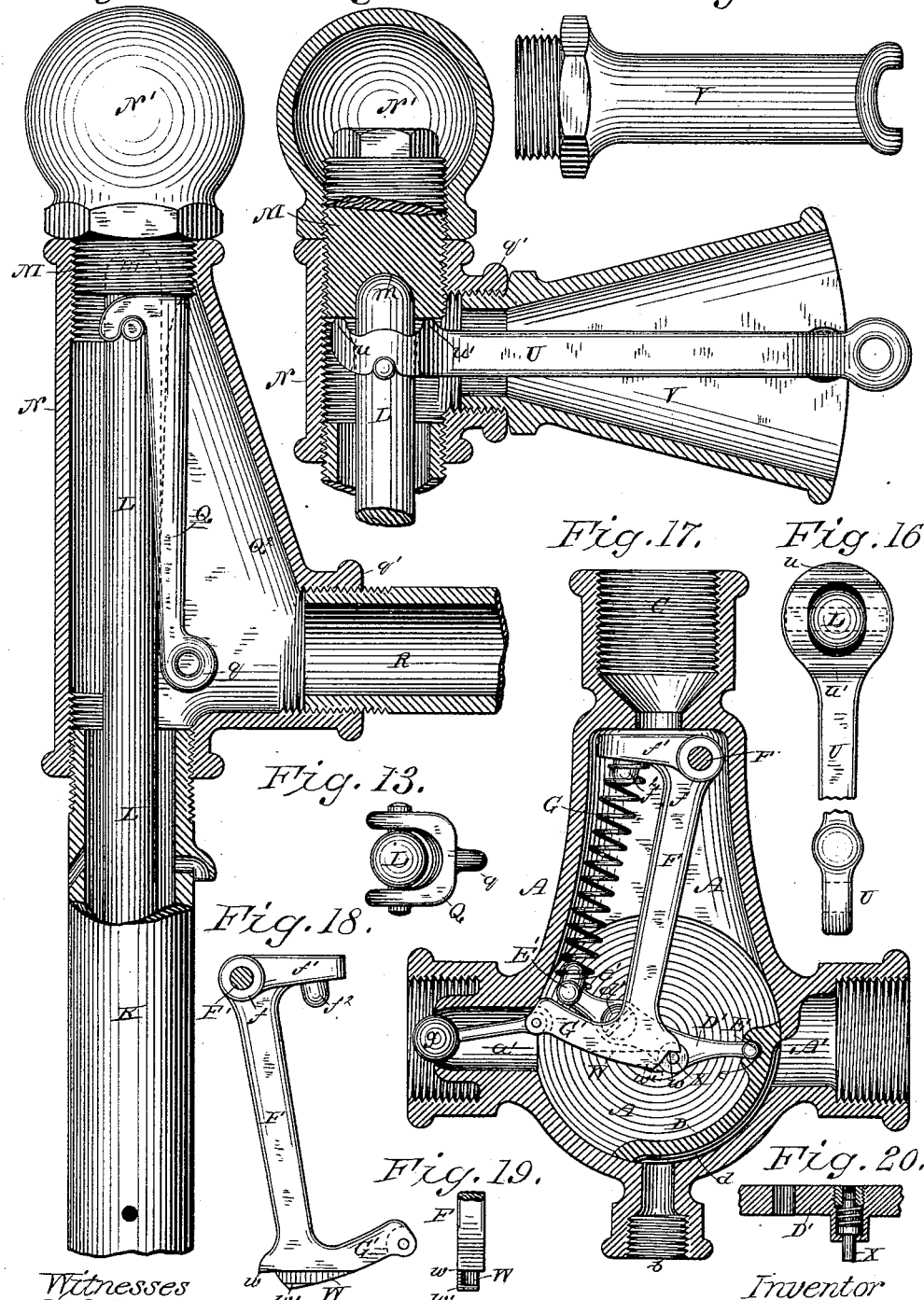
Witnesses
E. C. Davidson
L. B. Night
Inventor
Edwin A. Newman,
By his Attorneys (No Model.) 4 Sheets—Sheet 4.

E. A. NEWMAN.
ANTI-FREEZING APPARATUS FOR WATER PIPES.

No. 346,308. Patented July 27, 1886.

Witnesses
E. O. Davidson
L. B. Night

Inventor
Edwin A. Newman,
By his Attorneys

UNITED STATES PATENT OFFICE.

EDWIN A. NEWMAN, OF WASHINGTON, DISTRICT OF COLUMBIA, ASSIGNOR OF ONE-FOURTH TO DAVID L. SNEDIKER, OF EMPORIA, KANSAS.

ANTI-FREEZING APPARATUS FOR WATER-PIPES.

SPECIFICATION forming part of Letters Patent No. 346,308, dated July 27, 1886.

Application filed October 10, 1885. Serial No. 179,535. (No model.)

*To all whom it may concern:*

Be it known that I, EDWIN A. NEWMAN, of Washington city, District of Columbia, have invented certain new and useful Improvements in Anti-Freezing Apparatus for Water-Pipes, of which the following is a specification.

My invention relates to improvements in that class of apparatus for preventing the freezing of water in pipes in which thermostats are employed to automatically actuate mechanism for cutting off the supply of water to the pipes when liable to freeze. In accordance with my improvements thermostatic apparatus automatically controls the operations of valve mechanism so as to both cut off and open communication between the source of supply of the water and the pipes to be protected against freezing, and the pipes are automatically drained or emptied when the supply to them is cut off, so that they may contain no water at rest at times during which freezing is possible, while hand-actuated mechanism is provided by which to operate the thermostatic apparatus, in order that by way of this apparatus the supply of water may be turned on temporarily at times when by the automatic operations of the thermostatic apparatus the supply has been cut off, and would, but for this hand-actuated mechanism, remain cut off until a rise of temperature such as to render freezing impossible, when by way of the thermostatic apparatus the valve mechanism is actuated to turn on the water automatically.

The subject-matter deemed novel will be pointed out by the claims after describing, by the aid of the accompanying drawings, a suitable organization of mechanism for carrying out my invention.

Figure 1:
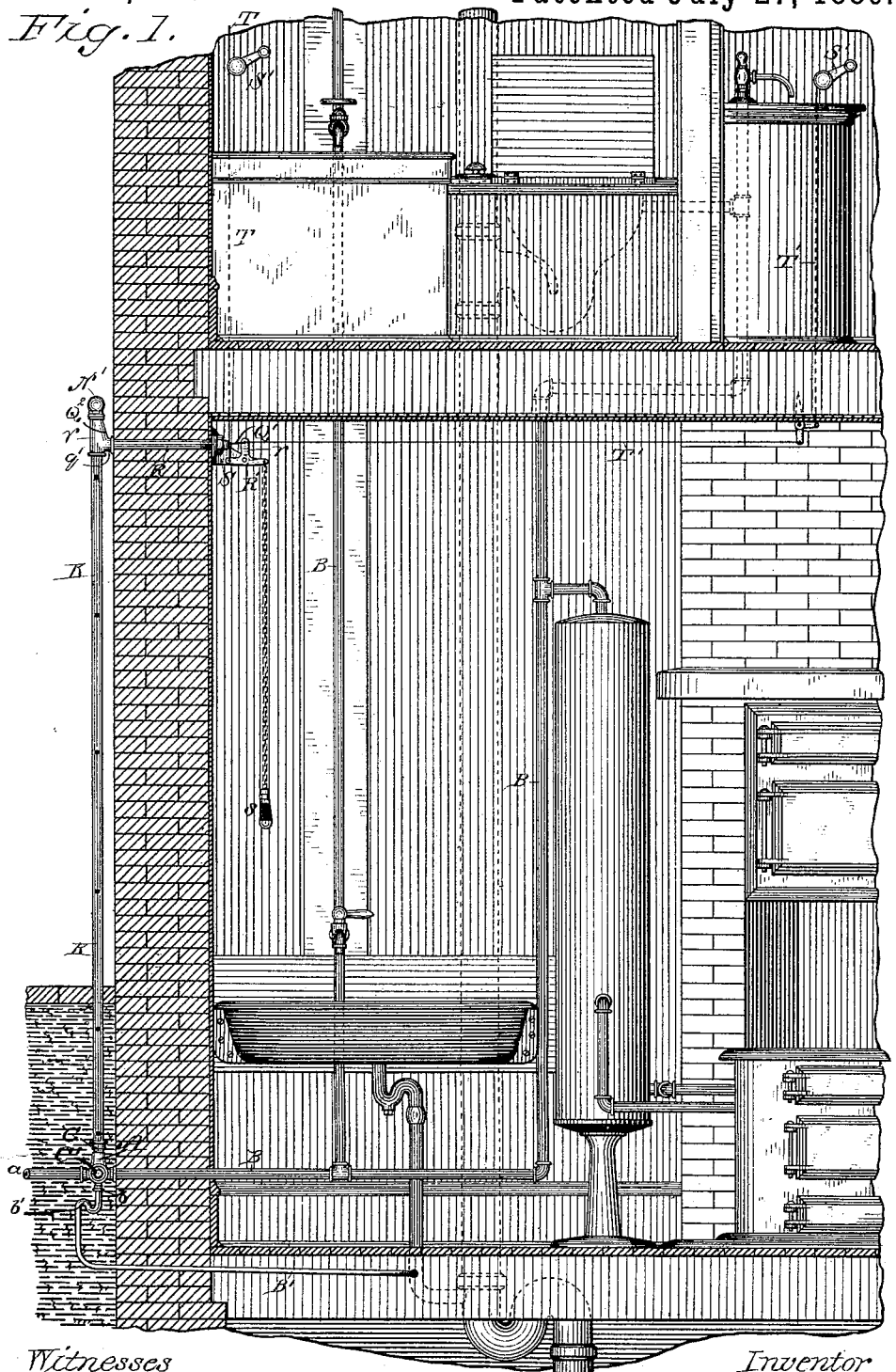
Figure 21:
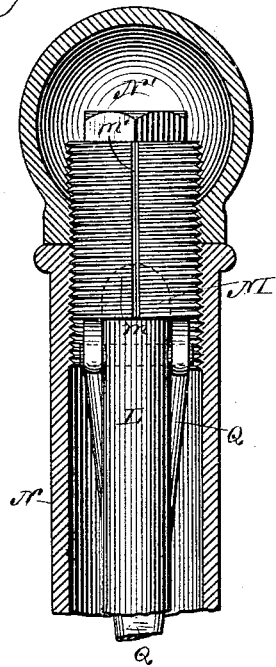
Figure 22:
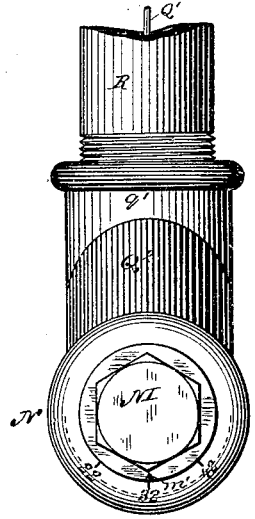
Figure 25:
Figure 23:
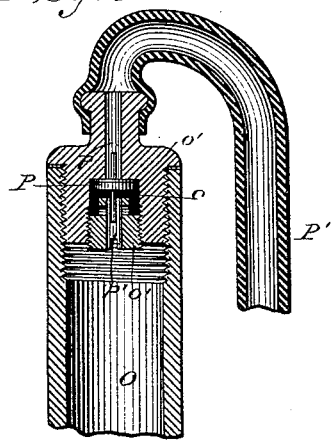
Figure 24:
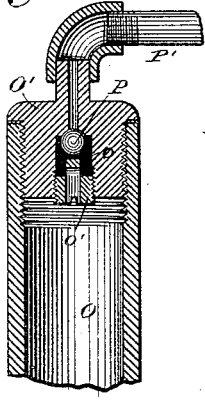

Figure 1 is a view in elevation, partly in section, showing portions of a dwelling-house, its water-service, &c., with my improvements applied thereto. Fig. 2 is a view, partly in vertical central section and partly in elevation, showing portions of the thermostatic apparatus and the valve mechanism controlled thereby, with the valve-casing having inlet, outlet, and waste openings. Fig. 3 is a view, partly in elevation and partly in vertical central section, at a right angle to Fig. 2, showing the valve mechanism and its casing. Fig. 4 is an elevation as seen from the rear (the back of the valve-casing) with parts in section, showing portions of the valve mechanism in different positions in full and dotted lines, the inner walls of the valve-casing being outlined. Fig. 5 is a view in elevation of the controlling-lever of the valve mechanism, which is operated upon by the thermostatic apparatus. Fig. 6 is a plan view of the lever which carries and actuates the valve of the valve mechanism and is controlled by the lever operated by the thermostatic apparatus. Fig. 7 is a view of the sliding valve of the valve mechanism, showing its under side. Figs. 8 and 9, respectively, show the screws by which the controlling and actuating levers of the valve mechanism are pivotally connected with the valve-casing. Fig. 10 shows a washer which confines the packing about the lower end of the thermostatic rod. Fig. 11 is a sectional elevation showing a modification of the thermostatic apparatus, a non-freezing liquid which is a good conductor being used within the casing and about the expanding and contracting rod of the thermostatic apparatus. Fig. 12 is a view, partly in elevation and partly in vertical central section, of the upper portion of the thermostatic apparatus, showing a lever by way of which to actuate the thermostatic apparatus by hand. Fig. 13 is a plan view of the thermostatic rod and its actuating-lever. Fig. 14 is a view, partly in elevation and partly in vertical central section, showing a modification of the means by way of which the thermostatic apparatus may be actuated by hand. Figs. 15 and 16, respectively, show plan views of the lever guideway and protector, and the lever and thermostatic rod represented in Fig. 14. Fig. 17 is a view partly in vertical section and partly in front elevation, showing a modification of the valve mechanism. Fig. 18 is a rear elevation of the controlling-lever of the modified form of valve mechanism, and Fig. 19 a view in elevation of the lower part of this lever at a right angle to Fig. 18. Fig. 20 is a horizontal section showing a portion of the valve-carrying lever of this modified form of valve mechanism and its spring-actuated pin operated upon by the controlling-lever. Fig. 21 is a sectional elevation of the upper portion of the thermostatic apparatus, and Fig. 22 a plan thereof with the cap-nut removed, these views representing an indicator by means of which to show the degree of temperature at which the thermostatic apparatus is adjusted to work to cut off the supply of water. Figs. 23 and 24 are sectional elevations showing venting appliances, by means of which air is admitted to the upper ends of the pipes from which the water is to be emptied when the supply of water is cut off. Fig. 25 is a bottom view of the spring carried by the lower end of the controlling-lever of the valve mechanism shown in Figs. 2 to 5, inclusive.

My improvements are in this instance shown as applied to the water-service pipes of a dwelling-house, the pipes having communication with the main supply-pipe by a lateral supply-pipe, and the waste water passing to a sewer, all as usual and well known. My improvements may, however, be otherwise applied—as, for instance, to the water service pipes of stables, factories, &c., and where the water is supplied otherwise than from a main pipe (as by a tank on the roof of the building) to the pipes in which the water passes.

As shown, the water passes from the source of supply by way of a pipe, $a$, to a valve casing, A, buried in the ground, into the nozzle of the inlet-opening $a'$ of which casing the supply-pipe is secured. This valve-casing has the outlet-opening A', communicating with the pipe B, which is to be supplied, this pipe B being the main service pipe of the house. A waste-pipe, B', having communication with the usual sewer-pipe, communicates with the waste-opening $b$ of the valve-casing, and is provided with the siphon $b'$, constituting a trap or water seal to prevent access of sewer-gas to the valve-casing. A fourth opening with a screw-threaded coupling-socket, C, is provided at the upper end of the valve-casing, and this casing is preferably made in a single piece with a circular front opening, into which screws the face disk or cover C', by the removal of which access is had to the interior of the casing to put in place and detach the valve mechanism. The valve-casing is buried outside of the house deeply enough to guard against the freezing of water therein.

Valve mechanism by which the outlet-opening and the waste-opening may be caused to communicate with each other, or the waste-opening be closed and the outlet-opening opened, is provided. This valve mechanism, as shown, is as follows: A slide-valve, D, is formed with a recess, $d$, upon its under side, which recess communicates between the outlet-opening and the waste-opening when the valve is in position to shut off communication between the outlet-opening and the source of supply of the water, as shown in Figs. 2 and 17. The actuating or carrying lever D' of the valve is pivoted by the screw $d'$ to the back of the valve-casing. At its outer end the valve-actuating lever is provided with the side arm, E, which fits loosely in a socket, $e$, in the valve. At its inner or heel end the actuating-lever is provided with another arm, E', parallel with its arm E. An upwardly-projecting stud, $e'$, is provided on this inner arm. A valve-controlling lever, F, is pivoted at its upper end, close to the top and at one side of the chamber of the valve-casing, by a screw, F', passing through a pivot-sleeve, $f$, of the controlling-lever. A short laterally-projecting arm, $f'$, is provided at the upper end of the controlling-lever. This arm is made rigid or in one piece with the main member, F, of the controlling-lever, and is provided with a downwardly-projecting stud, $f^2$. A coil-spring, G, extends between the side arm, $f'$, of the controlling-lever and the heel end of the valve-actuating lever. This spring embraces, at its opposite ends, the studs $e'$ $f^2$ of the actuating-lever and controlling-lever, respectively. This spring is under tension, and acts constantly, with a tendency to spread apart the controlling lever arm $f'$ and the inner end of the valve-actuating lever, as will readily be understood. At its lower end the controlling-lever is bent or provided with a laterally-projecting arm, G', extending in a direction approximately parallel with the short arm $f'$ at the top of the controlling-lever and toward the inlet-opening of the valve-chamber. The pressure of the current of water entering to the valve-chamber by the inlet-opening thereto acts upon a suitable valve-checking attachment of this arm with a force sufficient, under ordinary circumstances, to hold the controlling-lever in the position in which it is represented by dotted lines, Fig. 4, thus preventing movement of the valve. The force exerted by the water upon the valve-check, shown as formed by the paddle or plate $g$ of the arm G', acts in opposition to the coil-spring which extends between the valve-actuating lever and short arm of the valve-controlling lever.

The manner in which the valve-actuating lever is operated by the controlling-lever is preferably as follows: At the lower end of the controlling-lever a spring, H, is provided. This spring is fastened in suitable manner, as by a screw, $h$, at its upper end to the controlling-lever, and is bent to correspond with the shape of the lower end of the controlling-lever, extending at its free end beneath the inner portion of the resistance arm of this lever. The controlling-lever is cut away upon the under surface of its lower end and at one side, (see Figs. 2, 4, and 5,) to form a guideway, $h'$, overlapped by the free end of the spring H. This spring H (see Figs. 4, 5, and 25) is notched or cut away, as at $i$, and shouldered, as at I. From this shoulder to the outer or free end of the spring it is of uniform width, corresponding to the width of the under side of the lower end of the controlling-lever and its resistance-arm. This spring, it will be understood, rests upon that portion of the lower surface of the controlling-lever which forms the back wall of the guideway $h'$. This guideway, it will be seen, is so formed that at and near the inner end thereof the space between its top wall and the spring is of a width sufficient to accommodate the end of a pin, J, of the valve-actuating lever, the space between the spring and top wall of the guideway diminishing gradually from the inner end of the guideway to the free end or point of the spring, as plainly shown in Fig. 4.

It will be seen that in operation the valve will be actuated as follows: When the controlling-lever is operated in such manner as to depress the outer end of its short arm $f'$ and correspondingly rock the resistance-arm downwardly and away from the inlet-opening to the valve-chamber, the guideway-pin of the valve-actuating lever, which at this time will be between the guideway spring and top wall of the guideway, will be acted upon in such manner as to depress the actuating-lever and correspondingly move the slide-valve downward and away from the outlet-opening of the valve-chamber. This movement downward of the valve continues until communication is opened by way of the valve-chamber between the inlet and outlet openings thereof and the waste-opening is closed. At or near the end of this movement of the valve the guideway-pin J, which has been gradually forcing the guideway-spring outward, passes from the inner surface of this spring and beyond its point, and is acted upon directly by the under surface of the arm G' of the controlling-lever. With the parts in the position in which they are left after this operation (see dotted lines, Fig. 4,) the supply of water is turned on. When the supply of water is to be cut off, the controlling-lever rocks in a direction opposite that in which it is moved to turn on the supply of water, as above described, and the guideway-pin of the valve-actuating lever is acted upon by the outer surface of the guideway-spring until the point is reached, just before which the parts assume the position in which they are represented in Fig. 2, at which time the guideway-pin will have been presented to the shoulder and cut-away portion of the guideway-spring, when the pin will quickly pass or jump upward to the limit of movement allowed it by the top wall of the guideway, and thus abruptly complete the movement required to be given to the valve to bring it into the position which it is represented as occupying in Fig. 2. This sudden movement of the valve in cutting off the supply of water and opening communication between the outlet-opening and waste-opening is imparted by the action upon the valve-actuating lever of the spring G, as will readily be understood, the quick movement imparted by the spring to the valve-actuating lever being such as to move the slide-valve from a position in which its upper end would not lap over the outlet-opening. The advantage of this mode of operation is that when the degree of temperature is reached at which the thermostatic apparatus (hereinafter to be described) is adjusted to operate, the supply of water will be at once completely shut off, and possibility of partially opening or partially closing communication between the valve-chamber and its openings is avoided.

The thermostatic apparatus which I prefer to employ to actuate the valve controlling lever of the valve mechanism is constructed as follows, and connects with the thermostat coupling, opening, or socket C of the valve-casing: A casing, K, for the thermostatic rod L, is made of a proper length of pipe, which may be composed of any suitable substance. So I prefer to employ steel. At its lower end the thermostatic casing is screwed into the coupling-socket C of the valve-casing. The packing-cavity in this socket, beneath the lower end of the thermostat-casing, is filled with suitable compressible material, over which rests a packing-washer, $k$, for an obvious purpose.

The thermostatic casing is provided with perforations at suitable intervals, in order that there may be a free admission and circulation of air, thus providing for keeping the air within the casing at the same temperature as the surrounding air for an obvious purpose.

The perforations in the thermostatic casing, instead of being made as shown in Fig. 2, may be inclined upwardly from the outside to the inside of the casing to guard against access of dirt, rain-water, &c., to the casing, (see Fig. 12,) and the openings in the casing may be hooded to guard against ready access of dirt, &c., to the openings.

The thermostatic rod or the main portion thereof is composed of material which will expand and contract under the influence of changes of temperature more readily than the casing when this casing is made of material such, for instance, as iron or steel. As shown, the thermostatic rod is made in sections, the upper portion of main section consisting of zinc or some equivalent substance which will readily expand or contract, according to variations of temperature, and the point or lower section of the rod being made of some harder metallic substance—such as brass or steel. The two sections of the rod of the thermostat are connected by an ordinary screw-coupling, L'. As plainly shown, the lower end of the rod of the thermostat passes through the packing and packing-washer and through the coupling opening into the top of the valve-chamber. The rod fits snugly in this opening at $l$.

A coil-spring, K', bearing at its lower end against the packing-washer and at its upper end against the screw-coupling of the thermostatic rod, acts with a tendency always to hold this rod at the limit of its upward movement, so that its upper end will bear against and in a socket, $m$, of an adjustable plug, M, in the upper end of the thermostatic casing. This plug is screw-threaded and engages internal threads of the casing.

The thermostatic casing is made in two sections, the upper auxiliary section, N, screwing onto the lower or main section, K. By adjusting the bearing for the upper end of the rod of the thermostat formed by the screw-plug M by applying a wrench to the nut upon the top thereof, the rod of the thermostat may be adjusted relatively to the casing, as desired, and by way of an indicator formed by figures representing degrees of temperature, provided upon the upper end of the thermostat-casing, and a notch, m', in the adjustable screw-plug, the degree of temperature at which the thermostatic apparatus is set to work is shown. The indicator in this instance provided has the numbers 22, 32, and 42, which serve to indicate whether the thermostat is adjusted to operate when the temperature falls to 42° or below that, to 22°, or to some intermediate point. Obviously, any desired adjustment can be provided for and the indicator made to show such adjustment. A cap, N', screwed to the adjusting-plug M, covers and protects the parts and serves to lock the adjusting-plug in its set position. The lower end of the rod of the thermostat bears upon the short arm of the upper end of the controlling-lever of the valve mechanism, and, as the lower section of the rod is made of some durable material, it is not liable to wear or batter by continued use.

The operation of the thermostatic apparatus will readily be understood from the before-explained operation of the valve mechanism, it being seen that when the thermostatic rod is contracted by cold and ceases to dog the controlling-lever the spring G of the valve mechanism will act upon the short arm of the controlling-lever with the result before described, and that when the rod of the thermostat elongates it will act upon the short arm at the top of the controlling-lever and move this lever in such position as to open communication between the inlet and outlet openings.

In order that when the supply of water is cut off the pipes within the building may be completely emptied, venting apparatus is provided at the upper ends of the pipes, that air may be admitted above the column of water in the pipe to insure the draining of the pipe by way of the waste-outlet.

As shown by Figs. 23 and 24, two forms of venting devices are provided, either of which may be used, as preferred. In Fig. 23 the top of a pipe, O, is shown as provided with a plug, O', perforated and formed with a valve-chamber, o. The bottom of the opening in the plug by which the valve-chamber is formed is closed by a screw, o', centrally perforated in the direction of its length. A disk-valve, P, plays up and down in the valve-chamber, and its stem projects into the venting passages or perforations p p' in the plug O and screw o', respectively. A pipe, P', which may be of rubber or of metal, is attached to a nozzle at the top of the plug, and through which the vent-passage p passes. This pipe serves to conduct away at a proper point water which may be forced out of the upper end of the pipe when the supply is first turned on. In Fig. 24, instead of a disk-valve, a ball-valve is employed. The construction of parts in other respects is the same as before.

From the above description it will be seen that when, by the action of the thermostat, the supply of water is cut off and communication opened between the outlet and waste openings of the valve-casing, the venting-valves will drop by gravity from their seats, and air will be admitted at the upper ends of the pipes and pass beneath the valves, so as to create the needed atmospheric pressure upon the column of water in the pipes and insure the emptying of them. When the supply of water is turned on, the valves will be held by the pressure of the water upon them to their seats, any water escaping from the upper ends of the pipes before the complete seating of the valves passing off by way of the conducting-pipes P'.

In order that water may be temporarily supplied at times during which, by the automatic action of the thermostat, the supply of water is cut off, hand-actuated mechanism for operating upon the thermostatic apparatus is provided as follows: A lever, Q, forked and doubly hooked at its upper end, embraces the thermostat-rod near its upper end and engages with a cross-pin secured thereto. At its outer or lower end the lever is provided with a hook or eye, q, to which is secured a wire, Q'. A housing or casing for the lever is formed with the upper section of the thermostat-casing. The flaring portion Q² of this casing allows of the proper movement being imparted to the lever to move downward the thermostat-rod by pulling upon the lower end of the lever. The fulcrum of the lever is formed by the action of the upper end of the lever against the base of the adjustable plug of the thermostat-casing, as will readily be understood.

A coupling-socket, q', formed at the side and near the lower end of the auxiliary section of the thermostat-casing, has connected with it a pipe, R, through which the wire Q' passes to the interior of the building, the pipe passing through the wall of the building. (See Fig. 1.) A nut and washer upon the threaded inner end of the pipe R serves to properly secure it in position. The wire Q', at its inner end, is connected with one arm, r, of a three armed or cross-shaped bell-crank lever, R', which is pivoted at the juncture of its arms to a supporting-bracket, S, formed with the washer which fits upon the end of the pipe R. Wires T T' connect with this bell-crank lever and pass to different parts of the building, and are provided with pull-handles S', in close proximity to every cock throughout the building, and thus provide for actuating the thermostat-rod by pressing it downward, so that the supply of water may be temporarily turned on when the thermostat-rod is contracted by cold and is acting to automatically cut off the supply of water. As in this instance shown, the third arm of the bell-crank lever R' is provided, in order that a hanging handle, s, may be used in connection with the lever Q.

It will be understood from the above description that the hand-actuated mechanism serves to turn on the supply of water temporarily whenever it is desired to draw water through the pipes. While there is a current through the valve-chamber produced by drawing the water from any one of the cocks, the pressure of the current upon the resistance-arm of the controlling-lever will hold this lever in the position in which it is represented by dotted lines, Fig. 4, or approximately in this position, and the valve will be held so as to leave unobstructed the outlet-opening from the valve-chamber. When the cock is turned to cut off the passage of water and thus stop the current through the valve chamber, the valve mechanism acts automatically, as already described, to shut off communication between the outlet-opening and the valve-chamber and open communication between this opening and the waste-opening. It will be understood that when there is no current through the valve-chamber the force of the spring G acting upon the controlling-lever overcomes resistance to the movement of this lever in the direction in which it is moved to cut off the supply of water.

By my improvements provision is made for guarding against possibility of freezing of water in the pipes by automatically cutting off the supply of water thereto and emptying them, and provision is made also for automatically turning on the supply of water when the temperature has risen to a point rendering freezing of water in the pipes impossible, and provision is further made whereby water may be turned on temporarily as desired during freezing weather without the danger of freezing of water in the pipes.

I do not wish to be understood as confining my improvements to details of construction or the precise arrangement of parts hereinbefore described, as my invention may be modified in various ways.

Some of the modifications will now be referred to.

Fig. 11 shows a portion of a thermostat, in which, instead of employing a perforated casing, a close casing is used, and the casing is filled with a liquid which is a good conductor—brine would answer a good purpose. By the use of a suitable liquid which is not liable to freeze the thermostat-rod while tightly inclosed is subjected to the variations of temperature as readily as though directly exposed to the atmosphere.

Figs. 14, 15, and 16 show a modification of the lever of the hand-actuating mechanism for controlling the thermostat to temporarily turn on the supply of water when it has been automatically cut off. Instead of the lever Q, I provide a lever, U, perforated to embrace the thermostat-rod above a cross-pin thereof, which is engaged by grooves of the lever and provided with two fulcrum lugs or bearings, $u$ $u'$, which are in contact with the under side of the adjustable plug M. In this way it will be seen that the thermostatic rod may be moved downward by either an upward or a downward pull upon the outer end of the lever U. A flaring guideway and protector, V, for the lever U is screwed into a coupling-socket of the thermostatic casing, as plainly shown.

Figs. 17, 18, 19, and 20 represent a modification of the valve mechanism. In accordance with this modification the guideway-spring of the controlling-lever is dispensed with, and the guideway W of this lever is formed by a slot in one side of its under surface. This guideway-slot is of cam-like form, inclining or gradually increasing in width from one end to the other, is of greatest width at the end next the shoulder $w$ of the controlling-lever, and from this end runs out gradually toward the rear surface of the lower end of the controlling-lever or its arms G'. (See Fig. 19.) As shown, the lower wall, $w'$, of the guideway W does not extend the full length of the guideway, (see Fig. 18,) a short lower wall being all that is necessary. The valve-actuating lever is provided with a spring-connected guideway-pin, X, (see Fig. 20,) instead of the before-described fixed guideway-pin. It will be understood that in operation, when water is to be turned on the spring guideway-pin entering the guideway at its widest portion as the controlling-lever is rocked is gradually moved inward by the compression of its spring until the controlling-lever has rocked far enough to allow the guideway-pin to pass out at the end of the cam-like guideway-groove, when the spring acts upon the pin to move it outward and beneath the arm G' of the controlling-lever. In cutting off the supply of water by the rocking movements of the controlling-lever in the direction opposite to that in which it moves when the above-described operations take place the guideway-pin, after having first been acted upon by the under surface of the resistance-arm and lower end of the controlling-lever beneath the guideway-groove, is presented shortly before the completion of the movement of the controlling-lever to the guideway-incline, at which time, by the action of the spring G upon the valve-actuating lever, the guideway-pin is caused to quickly move upward to the shoulder $w$, thus causing the valve to abruptly and completely cut off communication between the valve-chamber and its outlet-opening. The valve-check attachment of the controlling-lever, instead of being a plate or paddle, as before, is in this instance a pivotally-attached ball. The current of water acts upon this ball-valve check for a purpose already explained. The inlet-opening to the valve-chamber is of suitable formation to accommodate this change in the resistance device, as plainly shown.

I claim as of my own invention—

1. The combination of the valve-casing having an inlet-opening, an outlet-opening, a waste-opening, and the thermostat-coupling opening, the valve mechanism within the casing, and the thermostatic apparatus connected with the valve-casing by the coupling-opening and controlling the operations of the valve mechanism to automatically cut off and automatically open communication between the source of supply of the water and the pipe to be supplied, while opening communication between the waste-opening and the outlet opening when the water is cut off and closing their communication when the water is turned on, substantially as and for the purpose set forth.

2. The combination of the valve-casing having the inlet-opening, the outlet-opening, and the thermostat-coupling opening, the valve mechanism within the casing, and the thermostat apparatus having the rod projecting into the valve-casing and acting upon the valve mechanism to automatically turn the water off and on, substantially as set forth.

3. The combination of the valve-casing having inlet, outlet, and waste openings, the valve by which the outlet-opening is opened and closed, and communication between the waste-opening and outlet-opening opened and closed, the actuating-lever thereof, the controlling-lever, the mechanism connecting these levers by way of which the actuating-lever is operated by the controlling-lever, and the thermostatic apparatus acting upon the controlling-lever, substantially as and for the purpose set forth.

4. The combination of the valve-casing having the inlet, outlet, and waste openings, the slide-valve, the pivoted actuating-lever thereof, the pivoted controlling-lever provided with the side arm at one end, the guideway and pin connection between its opposite end and the actuating-lever, and the spring connected at its ends with the side arm of the controlling-lever and the end of the actuating-lever opposite that engaging the valve, substantially as and for the purpose set forth.

5. The combination of the valve-casing having inlet and outlet openings, the sliding valve, the pivoted controlling-lever having connection with the valve, and the valve-check with which the controlling-lever is provided, substantially as and for the purpose set forth.

6. The combination of the valve-casing having inlet and outlet openings, the valve by which the outlet-opening is opened and closed, the valve-actuating lever, the controlling-lever, its valve-check attachment, mechanism connecting these levers by way of which the actuating-lever is operated by the controlling-lever, and the thermostatic apparatus acting upon the controlling-lever, substantially as and for the purpose set forth.

7. The combination of the valve-casing having the inlet and outlet openings, the slide-valve, the pivoted actuating-lever thereof, the pivoted controlling-lever provided with the side arm at one end, the mechanism by which the controlling-lever at its opposite end is connected with and operates the actuating-lever, the spring connected at its ends with the inner end of the actuating-lever and the side arm of the controlling-lever, the valve-check, and the rod of the thermostat acting upon the side arm of the controlling-lever, substantially as and for the purpose set forth.

8. The combination of the valve-casing having inlet and outlet openings, the slide-valve, the pivoted actuating-lever engaging the valve at its outer end, the guideway-pin of the actuating-lever, the controlling-lever cut away at its lower end and provided with the notched and shouldered spring forming a guideway, the side arm of the controlling-lever, and the spring acting at its opposite ends upon the side arm of the controlling-lever and the inner end of the actuating-lever, substantially as and for the purpose set forth.

9. The combination of the valve-casing, the thermostatic casing secured at its lower end in the coupling-socket of the valve-casing, the thermostatic rod, the valve, and the controlling-lever pivoted in the casing and having connection with the valve, substantially as and for the purpose set forth.

10. The combination of the thermostat-casing, the thermostat-rod, the valve-casing having the coupling-socket for the thermostatic casing, the valve, the controlling-lever having connection with the valve, the spring acting on the thermostatic rod, the packing-socket and packing for the thermostatic rod at its end entering the valve casing, and the bearing-socket for the opposite end of the thermostatic rod formed by the plug of the thermostatic casing, substantially as and for the purpose set forth.

11. The combination of the valve-casing having the inlet and outlet openings, the valve mechanism, the thermostatic casing, the coupling-socket by which it is connected to the valve-casing, the thermostatic rod acting on the controlling-lever of the valve mechanism, the spring acting on the thermostatic rod, and the adjustable plug in the end of the thermostatic casing, substantially as and for the purpose set forth.

12. The combination of the valve-casing, the valve mechanism, the thermostatic apparatus controlling the operation of the valve mechanism, and the indicator by which to show the degree of temperature at which the thermostatic apparatus is set to work, substantially as and for the purpose set forth.

13. The combination of the thermostatic casing, the thermostatic rod, the adjustable screw-plug in the upper end of the thermostatic casing and against which the thermostatic rod bears, and the screw-cap, substantially as and for the purpose set forth.

14. The combination of the valve-casing having the inlet, outlet, and waste openings, and the thermostat-coupling opening, the pipe or pipes to be supplied with water, the valve mechanism within the casing, the thermostatic apparatus connected with the valve-casing by its coupling-opening and acting on the valve mechanism, and the venting apparatus by which air is admitted to the upper end or ends of the pipe or pipes to be emptied, substantially as and for the purpose set forth.

15. The combination of the valve-casing having the inlet and outlet openings, and the thermostat-coupling opening, the pipe or pipes to be supplied with water, the valve mechanism, the thermostatic apparatus connected with the valve-casing by its coupling-opening and acting upon the valve mechanism to automatically cut off and automatically turn on the supply of water, the lever operating upon the thermostatic apparatus and its connecting hand-actuated mechanism, by which to temporarily turn on the water at times during which the water has been cut off by the automatic action of the thermostatic apparatus, substantially as set forth.

16. The combination of the valve-casing having the inlet, outlet, and waste openings, and a thermostat-coupling opening, the pipe or pipes to be supplied with water, the valve mechanism, the thermostatic apparatus connected with the valve-casing by its coupling-opening and acting upon the valve mechanism to automatically cut off and automatically turn on the supply of water, hand-actuated mechanism having connection with and operating upon the thermostatic apparatus to temporarily turn on the water at times during which the water has been cut off by the automatic action of the thermostatic apparatus, and the venting apparatus, by which air is admitted to the upper end or ends of the pipe or pipes to be emptied, substantially as and for the purpose set forth.

17. The combination of the valve-casing having the inlet and outlet openings, the pipe or pipes to be supplied with water, the valve mechanism, the thermostatic apparatus automatically controlling the operations of the valve mechanism, and the hand-actuated mechanism operating upon the thermostatic apparatus and provided with pull-handles in close proximity to the cocks of the pipe or pipes supplied with water, substantially as and for the purpose set forth.

18. The combination of the thermostatic casing, the thermostatic rod, the valve-casing having inlet and outlet openings, the valve mechanism automatically actuated to cut off and turn on the supply of water, and the hand-actuated lever for operating upon the thermostatic rod, substantially as and for the purpose set forth.

19. The combination of the thermostatic casing, the thermostatic rod, the spring acting upon the thermostatic rod, the bearing against which the spring presses the thermostatic rod, the lever for operating upon the thermostatic rod, and the pull devices for actuating this lever, substantially as and for the purpose set forth.

20. The combination of the valve-casing having inlet and outlet openings, the valve by which the outlet-opening is opened and closed, the valve-actuating-lever, the controlling-lever, its valve-check attachment, mechanism connecting these levers by way of which the actuating-lever is operated by the controlling-lever, the thermostatic apparatus acting upon the controlling-lever to automatically control the operations of the valve mechanism to cut off and turn on the water, and the hand-actuated mechanism for operating the thermostatic apparatus, substantially as and for the purpose set forth.

21. The combination of the valve-casing having the inlet and outlet openings, the slide-valve, the pivoted actuating-lever connecting at its outer end with the valve, the pivoted controlling-lever provided with the side arm at its pivoted end, the mechanism by which the controlling-lever at its opposite end is connected with and operates the actuating lever, the spring connected at its ends with the inner end of the actuating-lever and the side arm of the controlling-lever, the resistance attachment of the controlling-lever, the thermostatic apparatus, the rod of which acts upon the side arm of the controlling-lever, and the lever by way of which to operate the thermostatic rod by hand to cause it to act upon the controlling-lever, substantially as and for the purpose set forth.

22. The combination of the thermostatic casing, the thermostatic rod, the spring acting upon the thermostatic rod, the adjustable plug of the thermostatic casing forming a bearing against which the thermostatic rod is pressed by its spring, the lever having its fulcrum against said plug, and the pipe attached at the side of the thermostatic casing, substantially as and for the purpose set forth.

In testimony whereof I have hereunto subscribed my name.

EDWIN A. NEWMAN.

Witnesses:
BALTUS DE LONG,
H. A. HALL.